(12) United States Patent
Schmieg et al.

(10) Patent No.: US 8,984,870 B2
(45) Date of Patent: Mar. 24, 2015

(54) LOW TEMPERATURE NOX STORAGE SYSTEM FOR LEAN EXHAUST AFTERTREATMENT

(75) Inventors: Steven J. Schmieg, Troy, MI (US); Chang H Kim, Rochester, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 942 days.

(21) Appl. No.: 13/031,708

(22) Filed: Feb. 22, 2011

(65) Prior Publication Data

US 2012/0210696 A1 Aug. 23, 2012

(51) Int. Cl.
*F01N 3/24* (2006.01)
*B01D 53/94* (2006.01)
*F01N 3/20* (2006.01)

(52) U.S. Cl.
CPC ........ *B01D 53/9481* (2013.01); *B01D 53/9431* (2013.01); *B01D 53/9477* (2013.01); *B01D 2251/2067* (2013.01); *B01D 2253/102* (2013.01); *B01D 2253/104* (2013.01); *B01D 2253/108* (2013.01); *B01D 2253/116* (2013.01); *B01D 2253/306* (2013.01); *B01D 2255/1021* (2013.01); *B01D 2255/1023* (2013.01); *B01D 2255/104* (2013.01); *B01D 2255/20723* (2013.01); *B01D 2255/20761* (2013.01); *B01D 2255/20776* (2013.01); *B01D 2255/50* (2013.01); *B01D 2255/91* (2013.01); *B01D 2255/911* (2013.01); *B01D 2257/404* (2013.01); *B01D 2257/80* (2013.01); *F01N 3/2066* (2013.01); *Y02T 10/24* (2013.01)
USPC .......................................................... 60/301

(58) Field of Classification Search
USPC ........................................... 60/284, 301, 303
See application file for complete search history.

(56) References Cited

U.S. PATENT DOCUMENTS

| | | | |
|---|---|---|---|
| 6,182,443 B1 | 2/2001 | Jarvis et al. | |
| 7,155,331 B1 | 12/2006 | Zhang et al. | |
| 7,332,135 B2 | 2/2008 | Gandhi et al. | |
| 7,490,464 B2 | 2/2009 | Li et al. | |
| 7,650,746 B2 | 1/2010 | Hu et al. | |
| 7,674,743 B2 | 3/2010 | Gandhi et al. | |
| 2004/0231321 A1* | 11/2004 | Yamato et al. | 60/275 |
| 2006/0168948 A1 | 8/2006 | Xu et al. | |

(Continued)

FOREIGN PATENT DOCUMENTS

| | | |
|---|---|---|
| DE | 19806062 A1 | 8/1999 |
| DE | 102011118243 A1 | 5/2012 |

(Continued)

*Primary Examiner* — Kenneth Bomberg
*Assistant Examiner* — Jonathan Matthias
(74) *Attorney, Agent, or Firm* — Reising Ethington P.C.

(57) ABSTRACT

Following a cold start of a hydrocarbon-fueled engine operated in a lean-burn-combustion mode, several seconds and minutes may be required for the exhaust gas stream to heat exhaust treatment devices in the exhaust system and conduit to their effective operating temperatures. The warm-up period may be particularly long for a NOx reduction catalyst (SCR) located downstream in the exhaust flow system. Accordingly, a bed of absorbent material, such as a suitably sized bed of alumina particles, located upstream of the SCR, is used to temporarily absorb water and NOx from a relatively cold exhaust until the exhaust has suitably heated the SCR to its operating temperature. Then, the warmed exhaust will remove the water and NOx from their temporary storage material and carry them to the reduction catalyst.

15 Claims, 4 Drawing Sheets

(56) References Cited

U.S. PATENT DOCUMENTS

| | | |
|---|---|---|
| 2006/0260296 A1 | 11/2006 | Theis |
| 2008/0006025 A1 | 1/2008 | McCarthy |
| 2010/0050604 A1 | 3/2010 | Hoard et al. |
| 2010/0192547 A1 | 8/2010 | Yabe et al. |
| 2010/0307141 A1* | 12/2010 | Wakao et al. .................. 60/288 |
| 2011/0083427 A1* | 4/2011 | Kawaguchi et al. ............ 60/287 |

FOREIGN PATENT DOCUMENTS

| | | | |
|---|---|---|---|
| EP | 2388449 A1 | | 7/2010 |
| JP | 2009103090 A | * | 5/2009 |
| WO | 2010082306 A1 | | 7/2010 |

* cited by examiner

LOW TEMPERATURE NOX STORAGE SYSTEM FOR LEAN EXHAUST AFTERTREATMENT

TECHNICAL FIELD

This invention pertains to the treatment of the nitrogen oxides (NOx)-containing exhaust gas from a diesel engine, or a lean-burn hydrocarbon-fueled engine, during engine warm-up when a catalyst material in the exhaust stream for the reduction of the NOx has not been heated to an effective operating temperature. More particularly, this invention pertains to the temporary absorption of water and NOx from a relatively cool exhaust stream until the NOx reduction catalyst has been heated to its operating temperature.

BACKGROUND OF THE INVENTION

Diesel engines, some gasoline fueled engines, and many other hydrocarbon fueled engines and power plants are operated at higher than stoichiometric air-to-fuel mass ratios for improved fuel economy. Many such engines comprise several cylinders, each with a reciprocating piston, into which air and fuel mixtures are sequentially introduced for combustion, and from which an exhaust gas stream is continuously expelled through an exhaust manifold into an exhaust conduit for eventual discharge into the ambient environment. Such engines that are controlled to operate at higher than their stoichiometric air-to-fuel mass ratio are sometimes called lean-burn engines, and the exhaust gas stream that they produce is called a lean exhaust, because it contains more oxygen from the excess air delivered to the cylinders of the engine.

Such lean-burning engines and other power sources produce a hot gaseous exhaust with relatively high contents of oxygen, water, and nitrogen oxides ($NO_x$). In the case of diesel engines, the temperature of the exhaust gas is typically in the range of 50-150 degrees Celsius from a cold engine and 200-400 degrees Celsius from a warmed-up engine (depending, for example, on engine load), and has a representative composition, by volume, of about 10% oxygen, 6% carbon dioxide, 5% water, 0.1% carbon monoxide, 180 ppm hydrocarbons, 235 ppm $NO_x$ and the balance substantially nitrogen. The exhaust gas often contains some very small carbon-rich particles. And to the extent that the hydrocarbon fuel contains sulfur, the exhaust from the combustion source may also contain sulfur dioxide. It is desired to treat such exhaust gas compositions to minimize the discharge of any substance to the atmosphere other than nitrogen, carbon dioxide, and water. A representative value of the flow rate of such an exhaust stream, with respect to the effective volume of exhaust treatment devices, is, for example, 25,000 $h^{-1}$.

The $NO_x$ gases, typically comprising varying mixtures of nitrogen oxide (NO) and nitrogen dioxide ($NO_2$), are difficult to reduce to nitrogen ($N_2$) because of the high oxygen ($O_2$) content in the hot exhaust stream. It is found that when much of the NO is oxidized to $NO_2$, there are selective catalytic reduction compositions and flow-through catalytic reactor designs for reducing much of the NO and $NO_2$ in the hot exhaust to nitrogen before the exhaust is discharged from the exhaust system. So, in many exhaust treatment systems for lean burn engines a suitable flow-through oxidation catalyst body is located suitably close to the engine exhaust manifold to promote the effective and timely oxidation of NO and CO and HC in the exhaust. A second catalyst material is located downstream from the oxidation catalyst reactor in the flowing exhaust gas stream for the reduction of much of the NO and $NO_2$ to nitrogen and water. Sometimes a reductant material is added to the exhaust gas to enable the selective reduction reaction, and other times the engine may be repeatedly, but very briefly, operated in a fuel-rich mode to supply small amounts of unburned fuel as a reductant for the nitrogen oxides.

On cold engine start-up, these oxidation and reduction catalyst materials must often be heated from an ambient temperature to their respective operating temperatures by the exhaust stream. It is necessary to convert most of the carbon monoxide and unburned hydrocarbons in the exhaust to carbon dioxide and water and to convert most of the NOx to nitrogen and water during all stages of engine operation, including the period when the exhaust system is being heated.

The upstream oxidation reactor with its catalyst material, close to the engine, is heated first by start of flow of the exhaust stream on engine start-up. But the downstream reduction catalyst material is farther from the heat source and slower to reach an operational temperature. During such a heating period some NOx material may pass untreated through the reduction catalyst material. The inventors herein recognize a need to make provision for improved handling of relatively cool NOx-containing exhaust gas until continued engine operation and exhaust gas flow can heat the reduction catalyst material to a temperature at which NOx can be effectively chemically reduced to nitrogen and water.

SUMMARY OF THE INVENTION

The exhaust gas produced in an engine, which is controlled and operated in a lean-burn combustion mode, is pumped out of an exhaust manifold and conducted as a flowing stream through a suitable conduit for discharge to the ambient atmosphere. The exhaust conduit typically comprises sections of stainless steel pipe which connect the exhaust stream successively to an oxidation catalyst reactor, a reactor for reduction of NOx, a filter for particulates, a sound muffler, and possibly other exhaust flow devices. After traversing such treatments the exhaust is discharged from the end of the tailpipe.

In general, the reduction of NOx in the oxidized exhaust stream from a lean-burn engine is accomplished using one of a family of chemical reduction methods, collectively referred to as the selective catalytic reduction (SCR) of NOx. After some oxidation of NO to $NO_2$ in the exhaust stream, a suitable amount of a reductant material, such as urea or ammonia, or a hydrocarbon-fuel mixture, or an alcohol such as ethanol, or the like, is added to and mixed with the flowing exhaust stream by injection into one of the pipe sections. The urea reacts with water in the hot exhaust gas to form ammonia. The reductant-modified exhaust stream then is directed into contact with a suitable SCR catalyst material, carried in a flow-through reaction container. As the exhaust stream flows through the SCR device, the added reductant material reacts with the NO and $NO_2$ to form nitrogen ($N_2$) and water.

Porous, crystalline aluminosilicate-based materials known as zeolites, which have been modified by ion exchange to contain, for example, copper or iron, have been used as SCR catalysts. Silicoaluminophosphate materials have been used as SCR catalysts. Platinum group metals or other metals such as silver carried as very small particles on larger particles of a ceramic material, such as alumina or titanium dioxide, have been used. Also, base metals such as vanadium and/or tungsten supported on ceramic carrier particles have been used. Such catalysts appear to absorb the nitrogen oxides and reductant additives in promoting the selective reduction of the nitrogen oxides in an exhaust stream that also contains carbon dioxide. Typically, the catalysts have to be heated to about 200° C. to serve as effective catalysts. Depending on the ambient conditions and the temperature of the exhaust system, it may take a period of a few hundred seconds to several minutes, following engine start, for the exhaust gas to heat the SCR catalyst to its effective operating temperature. During this time NOx is passed-through the SCR material (and even desorbed from it) and discharged into the atmosphere.

In accordance with embodiments of the subject invention, an absorbent bed of alumina particles, with suitable surface area, is placed just upstream from the SCR catalyst material. For example, suitable alumina particles typically have surface areas in the range of about 100-200 square meters per gram. The absorbent bed material does not carry catalyst materials such as metal particles or ions, but is sized and arranged solely to absorb water and NOx from a relatively cool exhaust stream. It is found that the absorption of water is particularly helpful. By absorbing water and some NOx from the lower temperature exhaust flow, the inventors have found that the SCR catalyst is also enabled to hold more NOx from the exhaust to reduce discharge of NOx from the exhaust system. Once the temperature of the exhaust is continually above about 200° C. or so, the alumina bed releases its NOx and water to the now-operative SCR reactor. Thereafter, the alumina bed is not required for treatment of the exhaust until the next cold engine start. But the function of the water and NOx absorbent alumina bed during low temperature exhaust flow improves the overall conversion of NOx to nitrogen and water.

While alumina particles with suitable surface area are preferred for temporary absorption of water and nitrogen oxides from a low temperature exhaust stream, other absorbent materials may be used for this purpose. For example, activated carbon particles, water absorbent zeolite materials or water absorbent molecular sieve materials may be adapted and supported in the flowing exhaust to temporally store water and nitrogen oxides until a downstream SCR reactor is suitably warmed-up. Suitable absorbent materials typically have surface areas in the range of about 50-500 $m^2/g$ and preferably in the range of about 100-200 $m^2/g$. Again, the absorbent materials are sized and arranged for temporary storage, and not for catalyzed action on the exhaust stream. The absorbent materials are used to hold their absorbed water and NOx until the absorbed materials are heated by the warming exhaust stream to a temperature of about 150° C. to about 200° C., or so.

In some embodiments of the invention, once the SCR reactor is operative, the warmed exhaust stream may be directed around the absorbent bed, by-passing it.

Other objects and advantages of the invention will become apparent from a more detailed description of preferred embodiments. In this description, illustrations are based on additions of ammonia to an exhaust stream as an exemplary and representative reductant material. Experiments were performed in a laboratory reactor configured to flow a simulated lean burn engine exhaust feed stream over monolith core samples. All monolith core samples were hydrothermally aged in air with 10% water content (a water content that commonly occurs in engine exhaust gas) to stabilize their performance. Gas compositions were measured using a Fourier transform infrared spectrometer to determine NOx, water, and ammonia concentration levels.

Reference will be made to drawing figures which are described in the following section of this specification.

DESCRIPTION OF PREFERRED EMBODIMENTS

Embodiments of the invention may be practiced following cold start of a lean burn engine, such as a diesel engine to reduce discharge of nitrogen oxides to the ambient atmosphere. An example of a practice of the invention will be illustrated with respect to a diesel engine.

Figure 1:
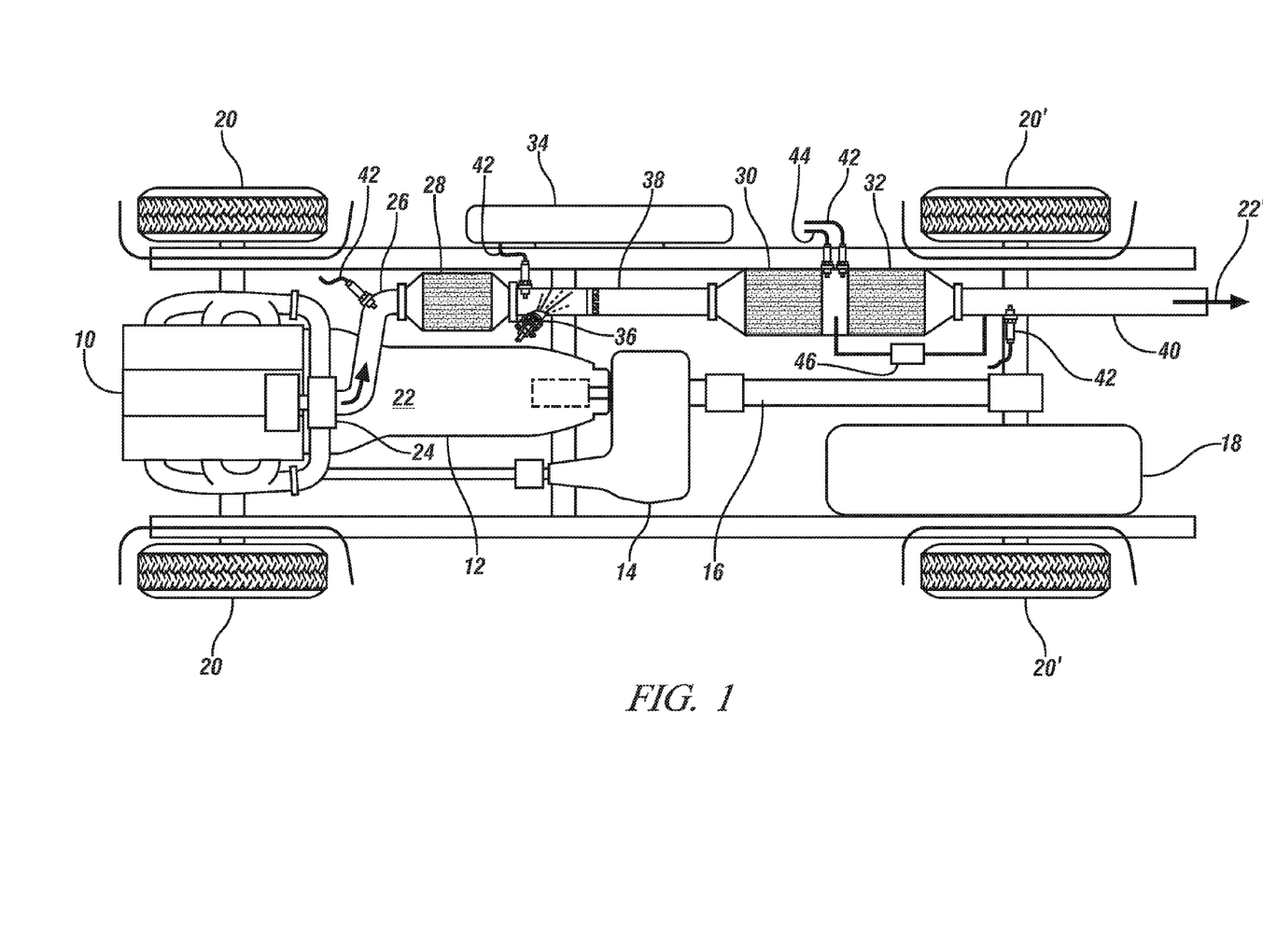
FIG. 1 is a schematic illustration of the engine, transmission and exhaust system of a representative light vehicle, powered by a diesel engine, and showing relevant features of the exhaust system, including a diesel oxidation catalyst, a urea tank, a urea injector and urea mixing zone, and an SCR reactor.

FIG. 1 is a schematic illustration of some elements of the powertrain and exhaust gas emission control system of a diesel engine powered, light vehicle, such as a four wheel drive, light duty pickup truck. Diesel engine 10, supplied with diesel fuel stored in fuel tank 18, delivers power to the input of transmission 12. In turn, a portion of the output of transmission 12 is directed by power take-off unit 14 to the front wheels 20 of the vehicle and a portion is connected to the rear wheels 20' by driveshaft 16.

Diesel engine 10 emits exhaust gases 22 which flow, as indicated by the arrow, from exhaust manifold 24 into the first of several connected tubular exhaust pipes 26 which channel and direct the exhaust flow through a series of emission control devices. After passing through the emission control devices the treated exhaust gases 22' exit the exhaust system at tailpipe 40. The emission control devices may include a diesel oxidation catalyst (DOC) 28, a selective catalytic reduction catalyst (SCR) 30 and a catalytic diesel particulate filter (CDPF) 32.

One component of the exhaust gases is NOx, a mixture of the oxides of nitrogen, NO and $NO_2$. It is preferred that NOx content of the exhaust gases be at least substantially reduced to $N_2$ and $H_2O$ before they exit the tail pipe. In lean burn engines, with their highly oxidizing exhaust gas chemistry, a reductant may be introduced into the exhaust stream to enable the reaction. A suitable reductant, among others, is urea, shown in FIG. 1 as stored in tank 34, which may be delivered by suitable feed means to injector 36 for injection into the exhaust stream upstream of SCR 30. To ensure appropriate mixing of the exhaust stream and the injected urea, a mixing zone 38 may be interposed between injector 36 and SCR 30. The urea is decomposed into ammonia. For appropriate control of the emitted exhaust gas 22' chemistry, appropriate sensors may be positioned in the exhaust system. These include a number of exhaust gas temperature sensors 42, a NOx sensor 44 and a diesel particulate pressure sensor 46.

Temperature data from the temperature sensors 42 and data representing the concentration of NOx from NOx sensor 44, and the pressure drop data over the catalytic diesel particulate filter 46 may be transmitted to a computer control module (not shown) that manages engine operation consistent with data received from the exhaust system. For example, the computer based control system likely relies on temperature data and NOx data in order to manage the introduction of urea into the exhaust stream. And the computer based control system may not initiate urea additions until suitable temperature signals are received for effective operation of the SCR device and for mixing of urea, and its decomposition to ammonia, in the exhaust gas.

As described, in the operation of a diesel engine powered vehicle, much of the emission control results from catalytic conversion of exhaust gases occurring primarily in an oxidation catalyst and a selective catalytic reduction catalyst. These catalytic devices promote the desired exhaust gas reactions and serve to most efficiently manage exhaust gas chemistry when the engine is at its normal operating temperature and the hot exhaust gas has heated the catalytic materials to temperatures of at least about 200° C. But during warm-up of the exhaust system from a cold engine start, it often takes a period of minutes before the exhaust gas heats the catalytic materials in the respective convertors to their more effective operating temperatures. The problem is most difficult with respect to the catalytic material used in the selective catalytic reduction of nitrogen oxide constituents because the SCR reactor is typically downstream in the exhaust system and slower to be heated.

In order to further assess how to improve the effectiveness of a SCR material during exhaust gas warm-up, the inventors conducted NOx absorption tests on a representative catalyst material. The selected SCR catalyst material was a commercial chabazite-zeolite (a crystalline aluminosilicate) which had been ion-exchanged to contain 3.5% copper, expressed as copper metal, with a nominal silica to aluminum molar ratio of 35:1. The copper-exchanged zeolite particles were slurried in water and coated on channel-wall surfaces of 400 cells per square inch cordierite honeycombs, dried and then calcined at 450° C. for thirty minutes. The material is considered suitable for reduction of nitrogen oxides in an exhaust stream when additions of urea (which decomposes to ammonia) are to be added to the flowing exhaust stream after the exhaust has flowed in contact with an oxidation catalyst.

The wash-coated copper-exchanged chabazite-zeolite catalyst material was initially hydrothermally aged in air and 10% water for 2.4 hours at 700° C. The aged material was then contained in a flow-through tubular vessel and maintained at a temperature of 25° C. Three simulated NOx-containing diesel engine exhaust streams were prepared and separate tests conducted with each simulated exhaust stream as they were flowed over the chabazite-zeolite catalyst material. Typically, the composition of NOx emitted from the engine during cold start is a mixture of roughly, by volume, 50% NO and 50% $NO_2$. Stream 1 comprised approximately 200 ppm NO, 10% $O_2$, 8% $CO_2$, and the balance nitrogen to assess the effect of no water and no $NO_2$ in a simulated stream. Stream 2 comprised 100 ppm NO, 100 ppm $NO_2$, 10% $O_2$, 8% $CO_2$, 2% $H_2O$, and the balance nitrogen. Stream 2 was formulated to assess the effects of each of NO, $NO_2$, and water in a simulated exhaust stream. Stream 3 comprised 100 ppm NO, 100 ppm $NO_2$, 10% $O_2$, 8% $CO_2$, and the balance nitrogen. Stream 3 was formulated to assess the presence of NO and $NO_2$ in a water-free stream. Each test was conducted by passing a stream over the Cu/chabazite-zeolite SCR catalyst material at 25° C. and at a space velocity of about 30,000 $hr^{-1}$. At time zero, the content of the respective streams was as stated above. The goal was to determine how much of the NOx constituents were absorbed by the respective volumes of SCR material. The content of the NO and $NO_2$ absorbed into the zeolite volumes from each of the three feed streams was measured, and the total weight of NOx absorbed on each SCR catalyst was determined. The respective compositions of the gas streams after leaving the respective SCR catalyst was determined using FTIR, as described above in this specification. This data revealed, by difference, the amount of NOx constituent absorbed at instant of the measurement. A plot of progressively absorbed amounts was integrated (ppm·sec) to determine (based on gas flow rate) the amount in grams absorbed of a specific NOx constituent.

Figure 2:
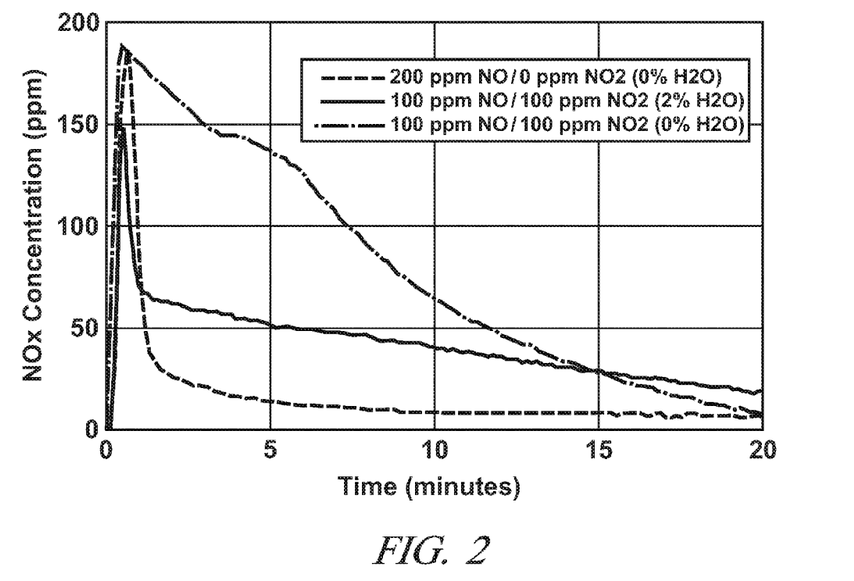
FIG. 2 is a graph showing the amount of $NO_X$ absorbed from three NO-containing gases, as a function of time over identical thermally-aged Cu/chabazite-zeolite SCR catalysts at approximately 25° C.

FIG. 2 is a graph in which the y-axis shows the amount of $NO_X$ (in ppm) that was progressively absorbed onto each aged Cu/chabazite-zeolite SCR catalyst sample as a function of time from the respective three feed streams of differing compositions. The time (in minutes) of flow of each simulated exhaust stream is plotted on the x-axis. The data for absorption onto the zeolite for simulated exhaust stream 1 is presented as the dashed line. The data for stream 2 is presented as the solid line, and the data for stream 3 as the dash-dotted line. No chemical reaction was expected or occurred at 25° C. Only the absorption of NOx (and probably water) was observed as indicted by the cumulative values of NOx concentration in each stream over the twenty minute period of each test. The amount of NOx absorbed by each Cu/chabazite-zeolite sample was also calculated as described above.

This NOx absorption data for the three streams revealed that very little $NO_x$ absorbs over the dry (stream 1, no water present in the feed stream) SCR catalyst when the $NO_x$ is present as NO only (no $NO_2$), or when the wet (2% water in the feed stream) SCR catalyst is exposed to an equi-molar mixture of NO and $NO_2$ (simulated exhaust stream 2). However, the dry (no water present in the feed stream) SCR catalyst (stream 3) stored the largest amount of $NO_x$, indicating that if the SCR catalyst can remain dry more $NO_x$ can be stored in the catalyst at low temperature (e.g., 25° C.).

A series of experiments was then conducted using alumina ($Al_2O_3$) as an absorbent material for water and for NOx. These tests were conducted with a view to determining if a body of alumina particles could be used to temporarily absorb water and/or NOx from a relatively cold exhaust stream, upstream of an SCR catalyst material, during the period immediately following a cold-start of a diesel engine, or the like.

Alumina particles were prepared, for example, using 10 g alumina (Rhodia, MI386, with a surface area of 180 $m^2/g$) which was ball-milled with 1.4 ml of alumina sol (pH=3.4) in 30 ml water. After ball-milling for 18 hours, the slurry was washcoated onto the channel walls of 400 channels per-square-inch monolith core samples. Once the target washcoat loading was reached, the monolith catalyst was dried, weighed, and finally calcined at 550° C. for five hours in static air. The channels of one set of such monoliths were coated with alumina particles in a loading amount of 100 grams of alumina washcoat per liter of outer, superficial volume of the monolith bodies, and the channels of another set of such monoliths were coated with a loading of 210 grams per liter of alumina particles.

A series of absorbency tests were conducted in which an alumina washcoated, honeycomb-shaped, flow through monolith was placed in a tubular passage so that a simulated exhaust stream had to flow through the wash coated channels. In each test a simulated exhaust feed stream comprising approximately 10% $O_2$, 2% $H_2O$, 750 ppm CO, 100 ppm NO, 100 ppm $NO_2$, and the balance $N_2$ was passed through the alumina washcoated monoliths at a space velocity of about 25,000 $h^{-1}$ (based on the outer volume of the monolith body). The temperature of the flowing exhaust stream was ramped from 25° C. to 225° C. at approximately 25° C. per minute during the test. The inlet amounts of water and of NOx constituents were not varied. In a first set of tests, the amount of water and NOx absorbed on the 100 g/L alumina-washcoated monoliths was continually measured as the temperature was increased. In a second set of tests the amounts of water and NOx constituents absorbed on the 210 g/L alumina washcoated monoliths was measured as the temperature was continually increased.

Figure 3A:
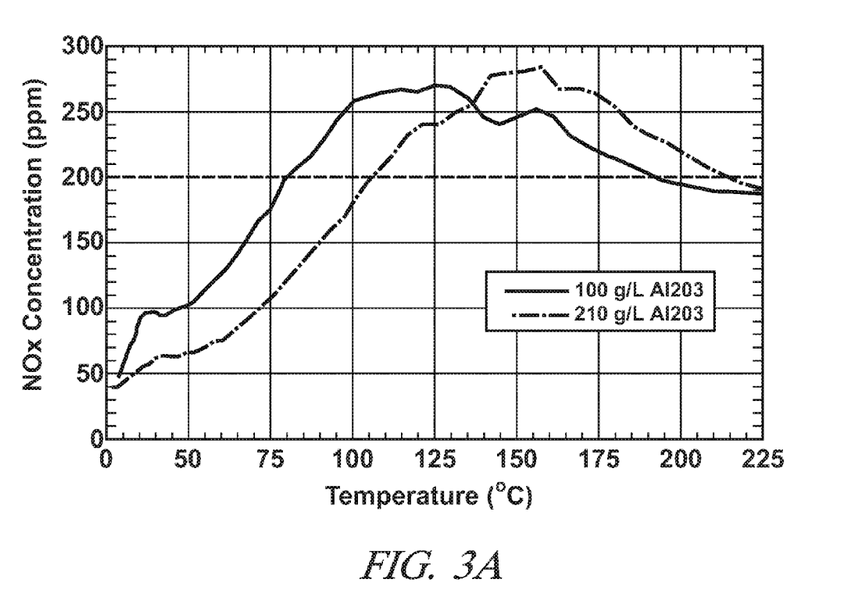
FIG. 3A is a graph showing the amount of $NO_X$ that is progressively absorbed and then desorbed as a function of increasing temperature over an aged absorbent bed of alumina particles supported on a flow-through honeycomb-shaped monolith substrate at two different alumina loadings.
Figure 3B:
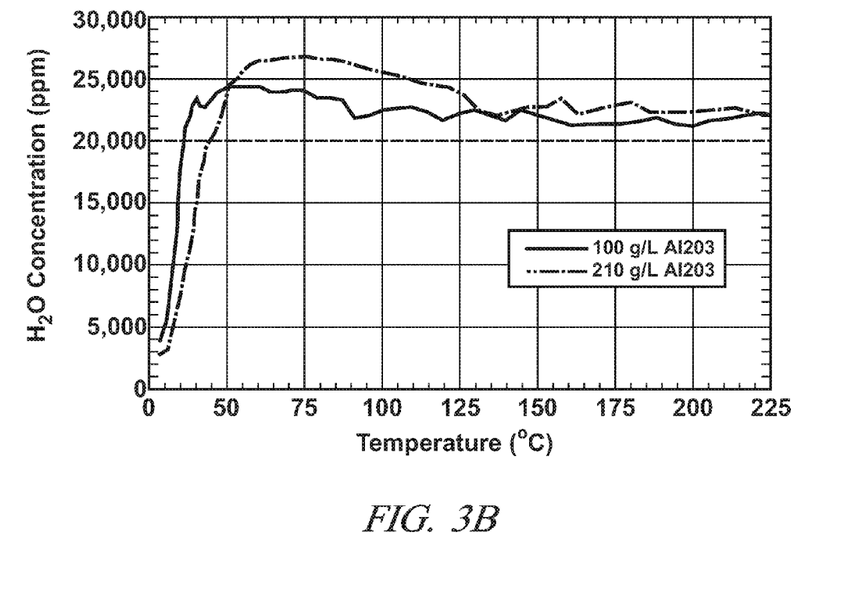
FIG. 3B is a graph showing the amount of $H_2O$ that is progressively absorbed and then desorbed as a function of increasing temperature over an aged absorbent bed of alumina particles supported on a flow-through honeycomb-shaped monolith substrate at two different alumina loadings.

FIG. 3A shows the amount of $NO_X$ and FIG. 3B shows that amount of $H_2O$ that absorbs and then desorbs as a function of temperature over an aged absorbent bed of alumina particles supported on a flow-through monolith substrate at two different alumina loadings (solid curve=100 g/L, dash-dotted curve=210 g/L). Temperature (° C.) is plotted on the x-axis and $NO_X$ (FIG. 3A) and $H_2O$ (FIG. 3B) concentrations (ppm), respectively, are plotted on the y-axes. The results of these absorbency tests show that as the alumina loading increases from 100 g/L to 210 g/L, more $NO_x$ and more $H_2O$ is stored at lower temperatures, which is then released/desorbed at higher temperatures. The inventors herein thus determined that the temporary storage of $H_2O$ from a relatively cold (but warming) exhaust stream on absorbent alumina particles can thus enhance the $NO_x$ storage over the SCR catalyst, as shown in their data presented in FIG. 2.

It is recognized that typically $NH_3$/urea-SCR catalysts have some amount of $NH_3$ stored on the catalyst from previous engine operation. A series of tests was conducted to assess how pre-absorbed or retained ammonia might affect the capacity of an ammonia-SCR catalyst to absorb NOx following cold-start of a diesel engine.

A Cu/chabazite-zeolite SCR catalyst material was hydrothermally aged in air and 10% water for 2.4 hours at 700° C. and was placed in a flow-through tubular reactor. A simulated exhaust feed stream comprising approximately 10% $O_2$, 2% $H_2O$, 750 ppm CO, 100 ppm NO, 100 ppm $NO_2$, and the balance $N_2$ was flowed over the SCR catalyst at a space velocity of about 12,000 $h^{-1}$. The temperature of the flowing stream was ramped from 25° C. to 375° C. at approximately 25° C. per minute and the amount of NOx constituents (in ppm) absorbed and released from the ammonia SCR catalyst material was progressively determined by FTIR as the temperature of the simulated exhaust stream was increased.

Figure 4:
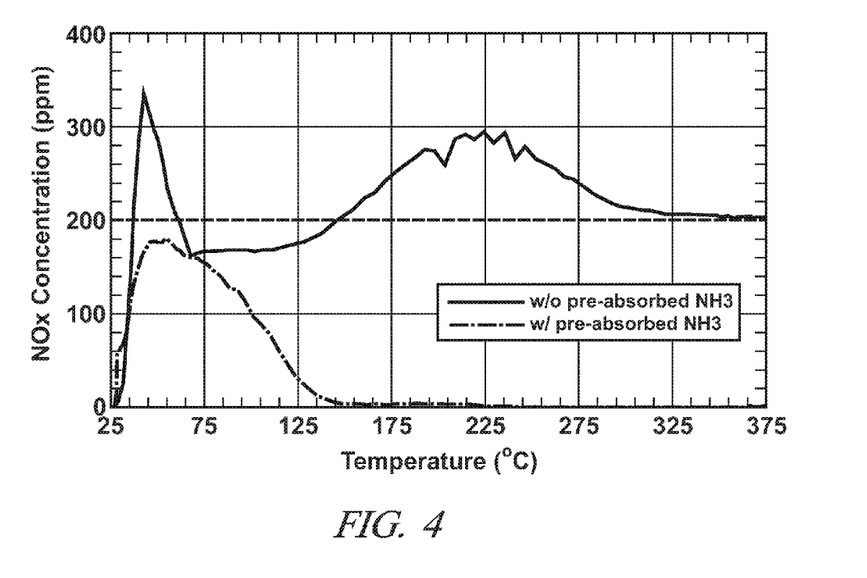
FIG. 4 is a graph showing, as a function of temperature, the amount of $NO_X$ that is absorbed and then desorbed, and/or reacted, when passed over an aged Cu/chabazite-zeolite SCR catalyst.

FIG. 4 is a graph showing the amount of $NO_X$ (in ppm, y-axis) that absorbs and then desorbs and/or reacts as a function of temperature over an aged Cu/chabazite-zeolite SCR catalyst. Temperature (° C.) is plotted on the x-axis. The solid curve shows the $NO_x$ stored and then released/desorbed without any pre-absorbed $NH_3$ on the SCR catalyst. The dash-dotted curve shows the $NO_x$ stored and then released and then reacted with approximately 1.2 g/L pre-absorbed $NH_3$ on the SCR catalyst. Note that the dash-dotted curve $NO_x$ concentration is much lower than the solid curve $NO_x$ concentration, indicating that pre-absorbed $NH_3$ can limit the $NO_x$ breakthrough at higher temperatures.

A series of tests was then conducted in which simulated exhaust streams heated to progressively increasing temperatures were passed first though a cordierite honeycomb shaped body washcoated with aged alumina particles and then over an aged Cu/chabazite-zeolite SCR catalyst. The alumina particles and catalyst particles were each hydrothermally aged in air and 10% water for 48 hours at 700° C. In some tests, quantities of ammonia were pre-stored on the SCR catalyst material ranging from approximately 0.4 g/L (low) to 0.8 g/L (medium) to 1.2 g/L (high).

Figure 5:
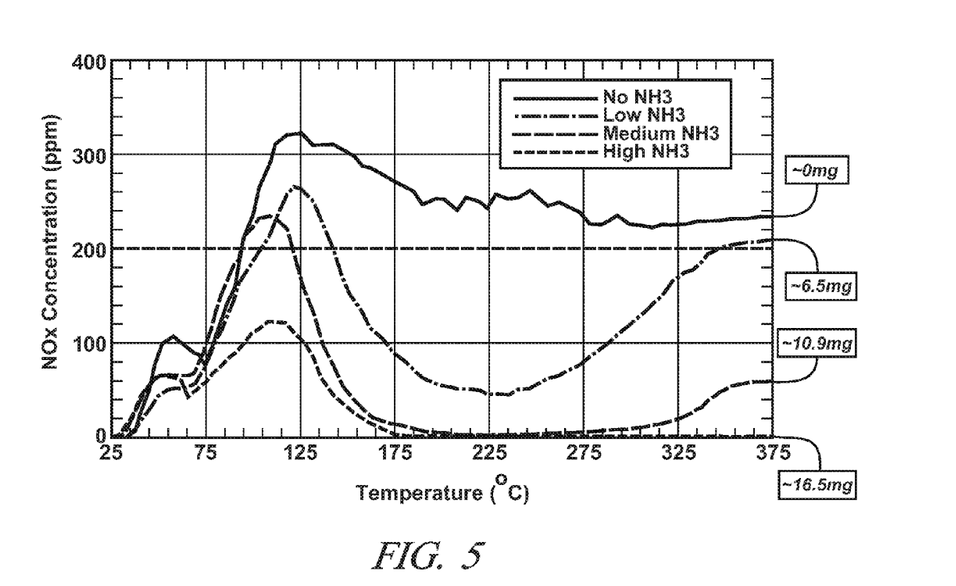
FIG. 5 is a plot showing, as a function of temperature, the amount of $NO_X$ that is absorbed/desorbed/reacted when first passed over an aged absorbent bed of alumina particles at an alumina loading of 310 g/L, and then over an aged Cu/chabazite-zeolite SCR catalyst.

A simulated exhaust feed stream comprising approximately 10% $O_2$, 2% $H_2O$, 750 ppm CO, 100 ppm NO, 100 ppm $NO_2$, and the balance $N_2$ was passed through the absorbent bed of alumina particles at a space velocity of about 12,000 $h^{-1}$ and then over the SCR catalyst at a space velocity of about 12,000 $h^{-1}$. As the gas was passed through these respective treatment bodies, the temperature of the gas was ramped from 25° C. to 375° C. at approximately 25° C. per minute FIG. 5 is a graph showing, as a function of temperature, the amount of $NO_X$ that absorbs/desorbs/reacts when first passed over an aged absorbent bed of alumina particles at an alumina loading of 310 g/L and then over an aged Cu/chabazite-zeolite SCR catalyst. Temperature (° C.) is plotted on the x-axis and $NO_X$ concentration (ppm) is plotted on the y-axis. The curves show the $NO_x$ stored and then released/desorbed or reacted with variable amounts of pre-absorbed $NH_3$ on the SCR catalyst. Note, that as the amount of pre-absorbed $NH_3$ increases the $NO_x$ breakthrough decreases.

A comparison of FIG. 5 with FIG. 4 shows that the upstream absorbent alumina particles greatly enhance the system performance, thereby allowing more $NO_x$ to be stored when the SCR catalyst is relatively cold. Then the stored NOx is reacted once the SCR catalyst temperature increases. Note that the data in FIG. 4 shows that $NO_x$ is released almost immediately once the temperature reaches below about 50° C., but the data in FIG. 5 indicates that the $NO_x$ does not exceed the inlet concentration until about 100° C. The amount of $NO_x$ absorbed in milligrams (mg) is also shown in FIG. 5. As shown in the data of FIG. 4, pre-absorbed $NH_3$ can limit the $NO_x$ breakthrough at higher temperatures.

Figure 6:
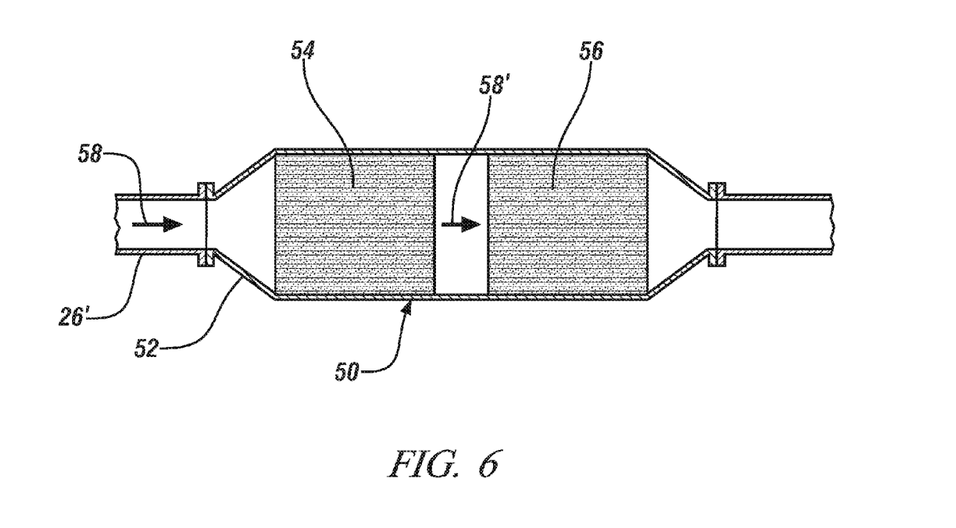
FIG. 6 is a schematic illustration of a flow-through, exhaust stream treatment container holding a combination of an upstream, water-absorbing and NOx-absorbing alumina bed and a downstream ammonia-SCR catalyst material. This apparatus may be used, for example, in a diesel exhaust system as illustrated in FIG. 1 for improved NOx management during cold start of the engine.

Thus, in accordance with embodiments of this invention, a body of alumina particles or other suitable water absorbing particles are placed upstream of an SCR catalyst material for reducing unwanted release of NOx constituents during a warm-up of the exhaust system following a cold start of a diesel engine or other lean burn exhaust engine. One suitable embodiment of an upstream (with respect to the direction of flow of an exhaust gas stream) alumina bed and a downstream SCR reactor 50 is illustrated in FIG. 6. Following a cold start of the engine a relatively cold exhaust stream 58 is directed through a section of exhaust conduit 26' to a cylindrical stainless steel container 52 sized to hold both an upstream extruded honeycomb body 54 with many flow-through channels, where the walls of each channel carry a thin washcoat layer of fine alumina particles. The exhaust stream 58' leaving the outlet side of the monolith body 54 then flows through a similar extruded monolith body 56 carrying a selective reduction catalyst. The composition of the selective reduction catalyst material may vary depending on the reduction additive selected for the engine and vehicle. In the case in which an ammonia-based, NOx reduction process is used, the SCR material may, for example, be a zeolite composition in which metal catalyst ions, such as copper or iron ions, have been exchanged for ions originally in the material as made.

Practices of the invention have illustrated by certain preferred, but non-limiting, embodiments. While the use of relatively high surface area aluminum particles have been illustrated for temporary absorption of water and nitrogen oxides from a cold exhaust stream, other water absorbing particulate compositions, as stated above in this specification, may be used in the exhaust stream as catalyst materials are being warmed to their operating temperatures.

The invention claimed is:

1. An exhaust gas treatment system for treating a flowing NOx-containing and water-containing exhaust gas stream from a lean-burn, hydrocarbon-fueled engine, the system comprising:
   a multi-cylinder, reciprocating piston engine, operable under lean-burn conditions, and producing the flowing exhaust stream following engine-start and thereafter during engine operation, the exhaust gas stream being progressively heated from a relatively low temperature following an engine cold-start to a higher temperature following engine warm-up; an engine exhaust gas stream passage leading from the engine to a flow-through container of non-catalyzed absorbent particles, the non-catalyzed particles consisting of absorbent alumina particles; and an engine exhaust passage leading from the container of absorbent particles to a flow-through container of a selective reduction catalyst material for the reduction of NOx constituents in the exhaust gas stream;
   the selective reduction catalyst material requiring heat from the exhaust stream following a startup of the engine to increase the temperature of the reduction catalyst material to an operative temperature for the material; and
   the composition and amount of the contained absorbent particles being determined to temporarily absorb water and NOx from a relatively low temperature, flowing exhaust stream before the selective reduction catalyst has been heated by the warming exhaust gas, and the absorbent particles thereafter releasing absorbed water and NOx constituents into the higher temperature exhaust to be carried into contact with the selective reduction catalyst material.

2. An exhaust gas treatment system as recited in claim 1 in which the absorbent particles consist of alumina particles having surface areas in the range of 50-500 $m^2/g$.

3. An exhaust gas treatment system as recited in claim 1 in which the absorbent particles consist of alumina particles applied as a washcoat on channel surfaces of a flow-through honeycomb support.

4. An exhaust gas treatment system as recited in claim 1 in which the selective reduction catalyst comprises a material selected from the group consisting of (i) a zeolite, ion-exchanged with metal ions for reduction of nitrogen oxides, and (ii) a silicoaluminophosphate.

5. An exhaust gas treatment system as recited in claim 1 in which the selective reduction catalyst is one or more metals supported on oxide particles, the one or more metals being selected from the group consisting of platinum, palladium, silver, tungsten, and vanadium.

6. A method of treating a flowing NOx-containing and water-containing exhaust gas stream from a lean-burn, hydrocarbon-fueled engine, where the flowing exhaust stream is passed in contact with a selective reduction catalyst for the reduction of NOx to nitrogen and water, the exhaust gas stream serving to heat the selective reduction catalyst, the method being practiced during periods following cold engine start-up and before the selective reduction catalyst has been heated by the exhaust stream to an operative temperature for the selective reduction catalyst, the method comprising:
   passing the NOx-containing and water-containing exhaust gas into contact with non-catalyzed absorbent particles, consisting of non-catalyzed absorbent alumina particles, before the exhaust stream is passed into contact with the selective reduction catalyst, the absorbent alumina particles being composed and sized to absorb water and NOx from the exhaust stream as the selective reduction catalyst is being heated to an operative temperature and, thereafter, to release absorbed water and NOx into the exhaust stream at a higher temperature as it flows to the selective reduction catalyst.

7. A method as recited in claim 6 in which the absorbent particles have surface areas in the range of 50-500 $m^2/g$.

8. A method as recited in claim 6 in which the absorbent particles consist of alumina particles applied as a washcoat on channel surfaces of a flow-through honeycomb support.

9. A method as recited in claim 6 in which the selective reduction catalyst comprises a material selected from the group consisting of (i) a zeolite, ion-exchanged with metal ions for reduction of nitrogen oxides, and (ii) a silicoaluminophosphate.

10. A method as recited in claim 6 in which the selective reduction catalyst is one or more metals supported on oxide particles, the one or more metals being selected from the group consisting of platinum, palladium, silver, tungsten, and vanadium.

11. A method of treating a flowing exhaust stream from a lean-burn engine, the flowing exhaust stream initially comprising carbon monoxide, incompletely-burned hydrocarbon fuel moieties, oxygen, water, nitric oxide, nitrogen dioxide, and nitrogen; the method being conducted on the exhaust stream from the lean-burn engine following a cold start and continuing on an exhaust stream from a warmed-up engine where the exhaust stream is at a temperature of 150° C. or higher, the method comprising:
   passing the exhaust stream through a oxidation catalyst reactor for oxidation of carbon monoxide, incompletely burned, hydrocarbon fuel moieties, and nitric oxide to nitrogen dioxide;
   passing the oxidized exhaust stream through a selective reduction catalyst for reduction of nitrogen oxide and nitrogen dioxide to nitrogen; and, at least during engine-start operating periods in which the selective reduction catalyst has not been heated to a predetermined operating temperature by the exhaust stream,
   passing the exhaust stream through a bed of non-catalyzed absorbent particles before the exhaust stream has reached the selective reduction catalyst, the absorbent particles consisting of absorbent alumina particles and being of an amount for temporarily absorbing water, nitrogen oxide and nitrogen dioxide from the exhaust stream until the selective reduction catalyst has been heated to its operating temperature, the temporarily absorbed materials being thereafter released from the bed of absorbent particles into a higher temperature exhaust stream.

12. A method as recited in claim 11 in which the absorbent particles have surface areas in the range of 50-500 $m^2/g$.

13. A method as recited in claim 11 in which the absorbent particles consist of alumina particles applied as a washcoat on channel surfaces of a flow-through honeycomb support.

14. A method as recited in claim 11 in which the selective reduction catalyst comprises a material selected from the group consisting of (i) a zeolite, ion-exchanged with metal ions for reduction of nitrogen oxides, and (ii) a silicoaluminophosphate.

15. A method as recited in claim 11 in which the selective reduction catalyst is one or more metals supported on oxide particles, the one or more metals being selected from the group consisting of platinum, palladium, silver, tungsten, and vanadium.

\* \* \* \* \*